US006834579B2

(12) United States Patent
Kuan

(10) Patent No.: US 6,834,579 B2
(45) Date of Patent: Dec. 28, 2004

(54) PALM FOOD PROCESSOR

(76) Inventor: Huo Feng Hsia Kuan, No. 32, Lane 2, Show-Gang Wu Street, Hsin-Tien, Taipei Hsien (TW)

( * ) Notice: Subject to any disclaimer, the term of this patent is extended or adjusted under 35 U.S.C. 154(b) by 25 days.

(21) Appl. No.: 10/291,622

(22) Filed: Nov. 12, 2002

(65) Prior Publication Data

US 2004/0069160 A1 Apr. 15, 2004

(30) Foreign Application Priority Data

Oct. 14, 2002 (TW) ........................................ 02282818 U

(51) Int. Cl.⁷ ........................... A23L 1/00; A47J 17/00; A47J 17/02; B26B 11/00; B26B 29/00
(52) U.S. Cl. ........................... 99/588; 99/541; 99/584; 30/279.6; 30/280; 30/304; 30/123.5
(58) Field of Search ........................... 99/540–543, 584, 99/588, 590, 591; 30/123.5, 123.6, 123.7, 279.6, 340, 280, 124, 304, 300, 310–312, DIG. 2

(56) References Cited

U.S. PATENT DOCUMENTS 5,251,377 A * 10/1993 Ho ........................... 99/588 X
5,471,746 A * 12/1995 Agrimis ..................... 30/123.5
5,845,565 A * 12/1998 McNair-Chaplin ........... 99/593
5,865,110 A *  2/1999 Yonezawa .................... 99/588
6,213,008 B1 *  4/2001 Kuan .......................... 99/492
6,302,014 B1 * 10/2001 Kuan .......................... 99/510

* cited by examiner

Primary Examiner—Timothy F. Simone
(74) Attorney, Agent, or Firm—Troxell Law Office PLLC

(57) ABSTRACT

A palm food processor includes a casing and a knife seat. The casing is composed of an upper cover and a lower cover detachably joined to each other oppositely with a receiving chamber formed between the two covers, a top side of the upper cover having a hand grip part and a bottom of the lower cover having a cover opening. The knife seat provides a size and a shape thereof corresponding to the cover opening for engaging with the cover opening and a bottom thereof having a cutter. Once a hand holds the handgrip part and the cutter contacts a treated food, the treated food can be cut, sliced, peeled or ground into processed products through repeated motions of the food processor and the processed products can be received in the chamber.

8 Claims, 6 Drawing Sheets

PALM FOOD PROCESSOR

BACKGROUND OF THE INVENTION

1. Field of the Invention

The present invention relates to a food processor, and particularly to a handgrip type food processor, which provides multiple functions such as skin peeling, slicing, shredding, grinding and etc. Furthermore, the discard or the finish product after the food being processed can be stayed in the casing of the processor for further disposal to avoid subsequent cleaning work.

2. Description of Related Art

Vegetables and fruits have been used as foods in our daily life since very ancient times. Due to the increasing incomes of ours, the cooked food and the cold vegetable plates with fruits are demanded to be getting delicate so that the housewife in the family or the person frequently eating raw vegetables know to prepare vegetable lumps, vegetable shreds such as peeled, shredded or powdered potato, cucumber, carrot, cheeses and etc. is full of miscellaneous trifles and it is very easy with carelessness to result in incised wounds accidentally so that it is inconvenient to perform the peeling or the shredding job unless skillful knife work is provided. Hence, the food processor in the kitchen such as the peeler, the vegetable shredding board, slicing device and grinder, the vegetable making have been developed for the preceding needs.

However, each of the preceding food processors only has a single function, that is, merely one of operations such as skin peeling, slicing, shredding or grinding can be conducted by the preceding food processor. Thus, all of the food processors have to be equipped in the kitchen and lead to inconvenient storage and extraordinary expenditure to an ordinary family.

Although related manufactures have improved and integrated a multifunctional food processor to overcome the foregoing shortcomings of the conventional food processors, for instance, the U.S. Pat. Nos. 6,213,008 and 6,302,014 owned by the present inventor, the finish products such as slices, shreds, lumps and powders made with the prior references have to be received with an external container and the discarded skin residues are randomly scattered around before completing the processing job. Accordingly, it results in a tedious subsequent cleaning work has to be done by the housewife so as to disadvantageously occupy most of their leisure time.

SUMMARY OF THE INVENTION

The crux of the present invention resides in that a palm food processor includes a casing and a knife seat. The casing is composed of an upper cover and a lower cover detachably joined to each other oppositely with a receiving chamber formed between the two covers, a top side of the upper cover having a hand grip part and a bottom of the lower cover having a cover opening. The knife seat provides a size and a shape thereof corresponding to the cover opening for engaging with the cover opening and a bottom thereof having a cutter. Once a hand holds the handgrip part and the cutter contacts a treated food, the treated food can be cut, sliced, peeled or ground into processed products through repeated motions of the food processor and the processed products can be received in the chamber.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
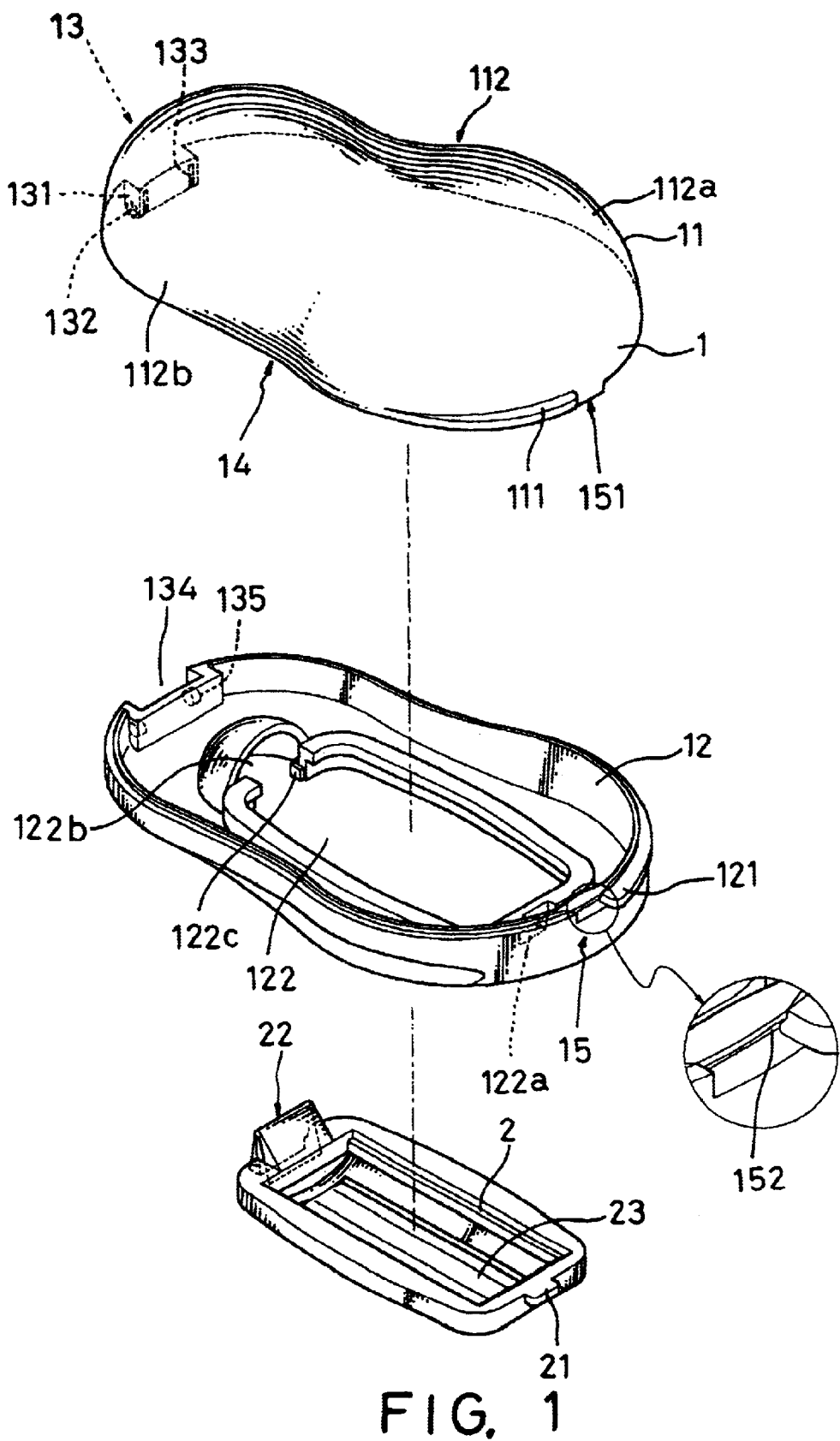
FIG. 1 is an exploded perspective view of a palm food processor of the present invention.

Referring to FIG. 1, a palm food processor a casing 1 and a knife seat 2.

Wherein, the casing 1 is composed of an upper cover 11 and a lower cover 12, which are pivotally joined to each other at an opposite end thereof respectively due to a pivot structure 13 so that the casing 1 can be opened or closed pivotally and a receiving chamber 14 is formed between the upper and the lower covers 11, 12 for the food product or the skin residue of the treated food after being cut, peeled, sliced or grinded. The pivot structure 13 as shown in FIG. 1 has an attaching piece 131 extending down from an end of the upper cover 11 and opposite end faces at the lower edge thereof have an axial hole 132 respectively. Each axial hole 132 at the inner side thereof has a longitudinal slit 133 so that the axial hole 132 provides a flexibility of stretching or shortening. The lower cover 12 has a fitting recess 134 corresponding to the attaching piece 131 for receiving the attaching piece 131 and provides an axial projection 135 corresponding to the two axial holes 132 respectively so that the axial holes 132 and the axial projections 135 can be engaged to each other. Of course, the pivot structure 13 is only an example and not a limitation and any device or structure can provide axial connection is belonged to the scope of the present invention.

Besides, the two covers at another respective end thereof provide an engaging device 15 so that the two covers can be opened from and closed to each other. In practice, the engaging device 15 has a protruding hook 151 extending downward from the end of the upper cover 11 and have a hook recess 152 corresponding to the protruding hook 151 so that an engagement can be performed with the projection hook 151 being joined to the hook recess 152. But, it is noted that the preceding engaging device 15 is an example and not a restriction. Meanwhile, the engaging device 15 at the surrounding edge thereof extending outward an upper cover rim 111 at the upper cover 11 and a lower cover rim 121 at the lower cover 12 thereof for being relatively stirred easily by the user so that the engaging device 15 can be disengaged conveniently.

Figure 4:
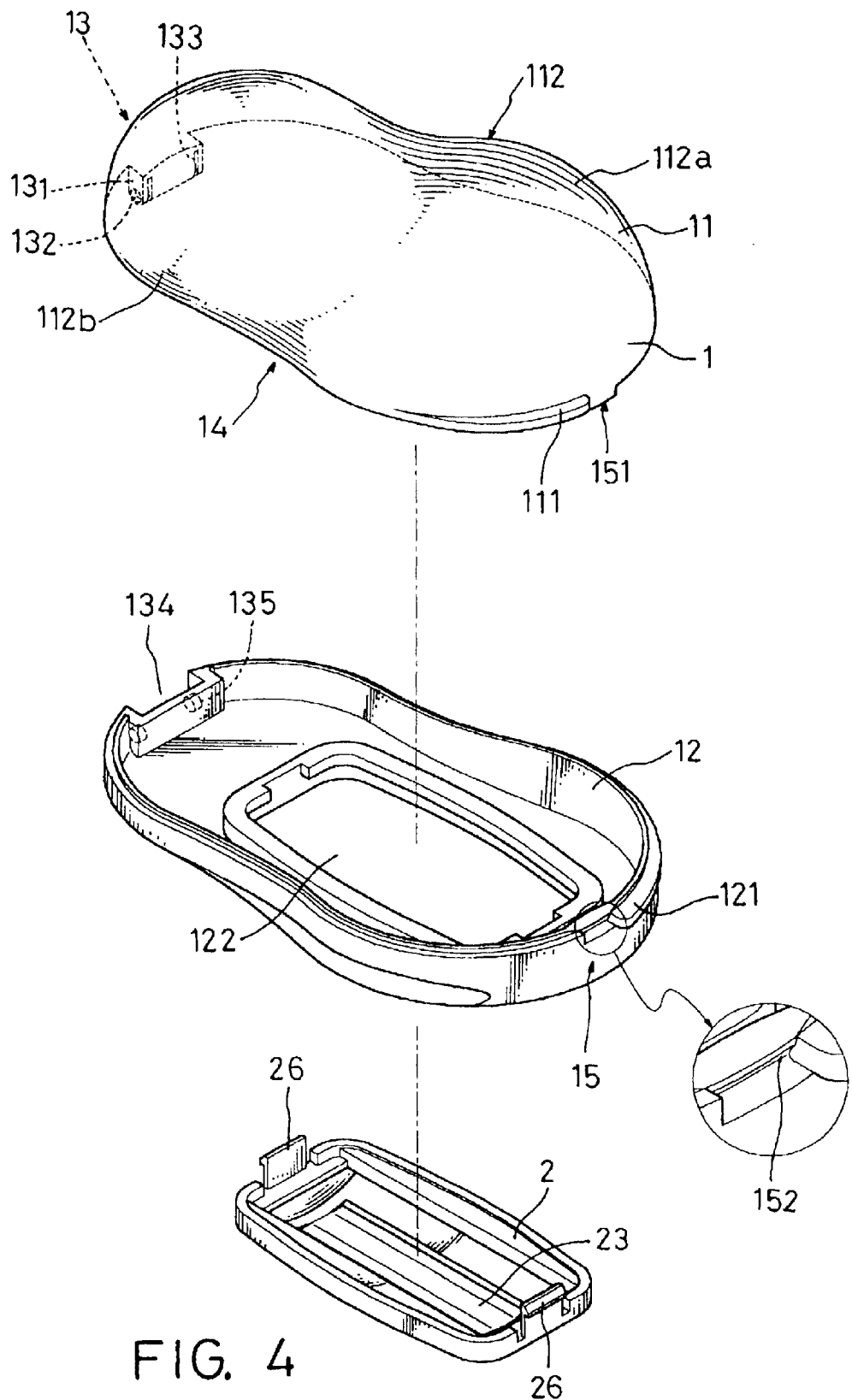
FIG. 4 is an exploded perspective view of a palm food processor of the present invention in another embodiment thereof.

A feature of the food processor disclosed in the present invention is characterized in that the upper cover 11 has a hand grip part 112 with a curvy shape complying with the human engineering so that an end of the hand grip part 112 is a wide and thick end 112a extends to a narrow and thin end 112b to provide a comfortable holding posture. Hence, the user can hold the wide and thick end 112a or the narrow and thin end 112b optionally depending on the individual palm size to acquire a comfortable holding posture and reduce the discomfort during operating the food processor. In addition, the lower cover 12 at the bottom thereof is provided with a cover opening 122 and the cover opening 122 can be rectangular as shown in FIG. 4 but it is noted that the rectangular shape is only an example not a limitation. As shown in FIG. 1, the cover opening 122 at a lateral side thereof has a recess 122a and at another side thereof has an engaging groove 122b with two opposite ends thereof having a projection hook 122c respectively.

Figure 2A:
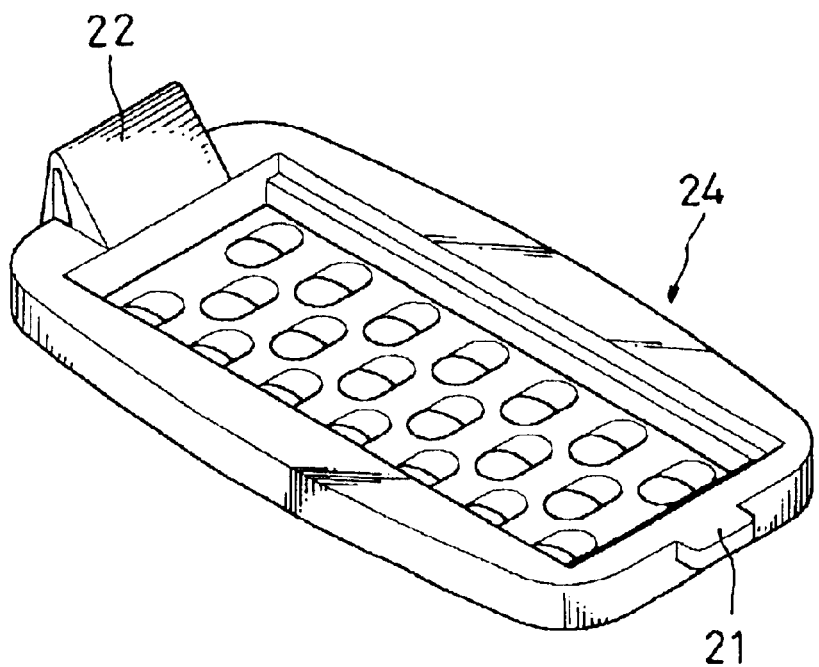
FIG. 2a is a perspective view of a knife base in the palm food processor shown in FIG. 1 illustrating an embodiment thereof.
Figure 2B:
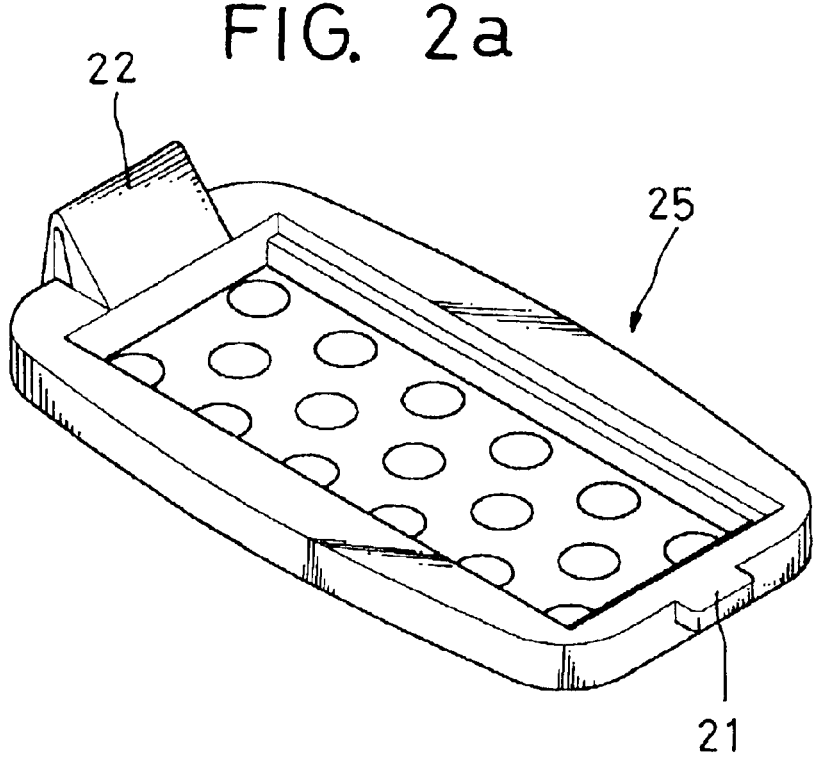
FIG. 2b is a perspective view similar to FIG. 2a illustrating another embodiment of the knife base.
Figure 5A:
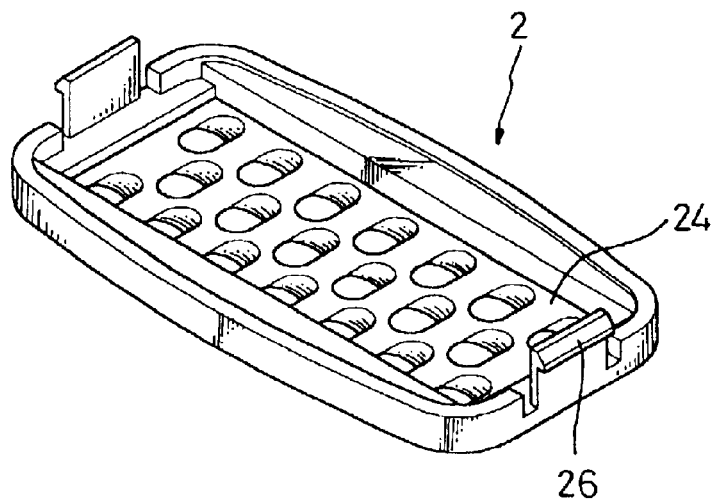
FIG. 5a is a perspective view of a knife base in the palm food processor shown in FIG. 4 illustrating an embodiment thereof.
Figure 5B:
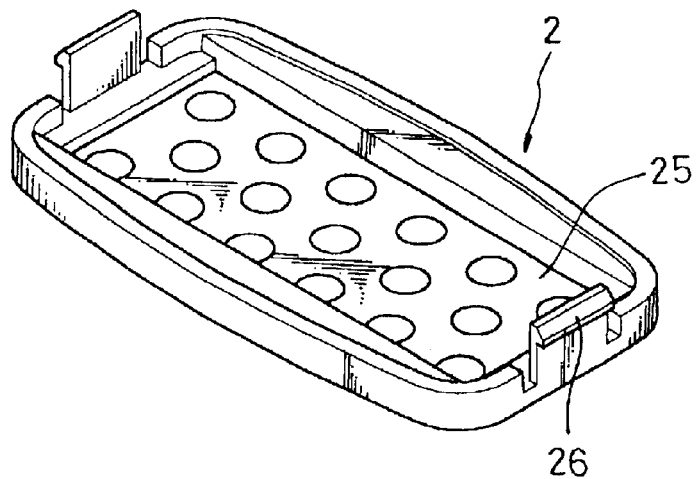
FIG. 5b is a perspective view similar to FIG. 5a illustrating another embodiment of the knife base.

The knife seat 2 is a base body with a size thereof corresponding to the cover opening 122 so as to be joined to the cover opening 122 and has a cutter at the bottom thereof. As shown in FIGS. 1 and 2, the knife seat 2 at both ends thereof has a projection 21 and an inversed V shaped press button 22 so that the projection 21 is inserted into the recess 122a and the press button 22 is engaged to the engaging groove 122b for being joined to the two projection hooks 122c. The knife seat 2 at the middle area thereof can be mounted a selected cutter such as a double-edge peering knife 23 or a shredding knife 24 with a plurality of slant peering holes as shown in FIGS. 2 and 5 based on the purpose of use such that it is possible to perform the operation of skin peeling, shred making or powder grinding. Besides, the knife seat 2 at both ends thereof extends upward an attachment ear 26 respectively to be attached to both ends of the cover opening 122 and located in the cover opening 122 as shown in FIGS. 4 and 5 such that the preceding effect can be reached as well.

Figure 3:
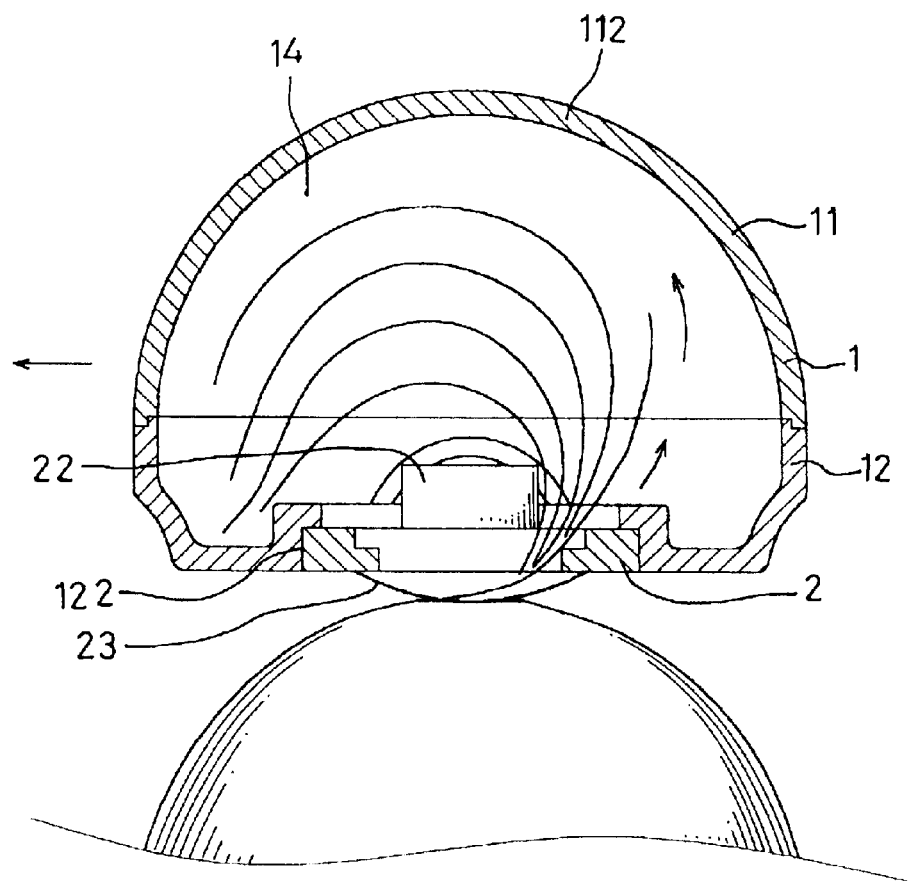
FIG. 3 is a sectional view illustrating motions during the palm food processor of the present invention being in operation.
Figure 6:
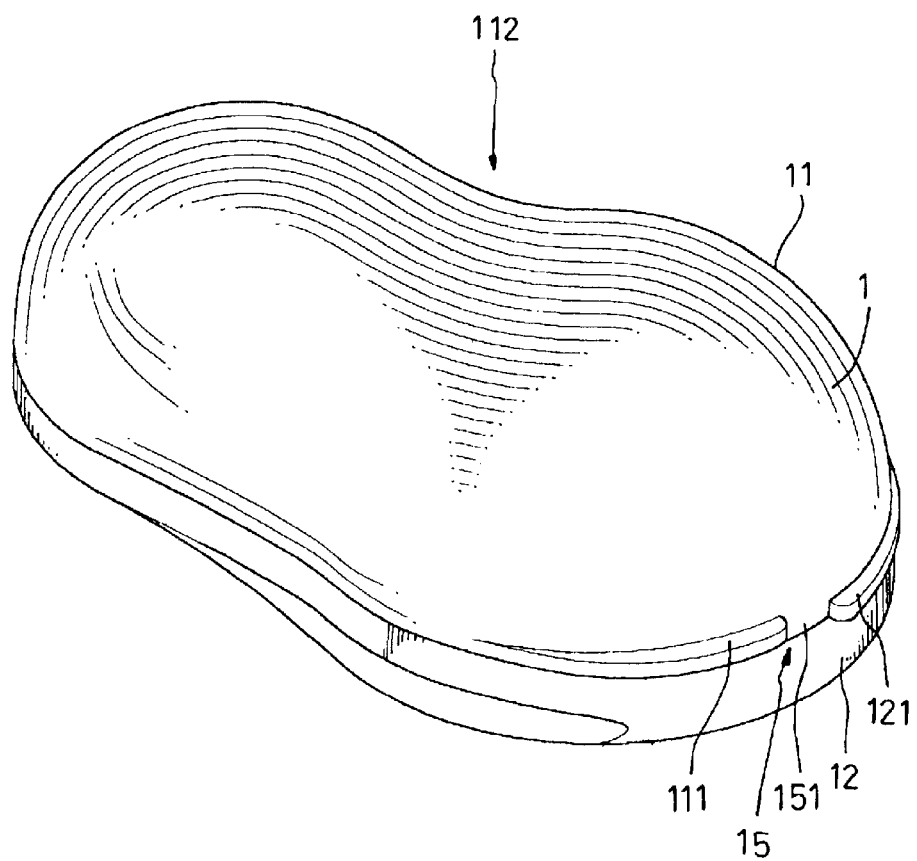
FIG. 6 is an assembled perspective view of the palm food processor of the present invention.

FIG. 6 shows a perspective view of a casing 1 composed of the upper and the lower covers 11, 12 with the knife seat 2 being joined to the cover opening 122 at the lower cover 12. Referring to FIG. 3, while the food processor of the present invention is in operation, the only thing has to be done by the user is to hold the hand grip part 112 tightly such that the treated food such as the carrot can be peered out the skin thereof and the skin residue strips then enter the receiving chamber 14 via a clearance in the double-edge peering knife 23. Once the peering job is complete, the user can disengage the engaging device 15 and the upper and the lower covers 11, 12 can be opened via the pivot device 13 such that the skin residues can be removed and discarded to avoid the subsequent work for clearing the skin residues and shorten the clearing time done by the housewife greatly. By the same token, in case of the knife seat 2 joined to the cover opening 122 being the shredding knife 24 or the grounding knife 25 instead of the peering knife, the shredded product or the powder product can stay in the receiving chamber 14 and it is not necessary to use a container for the products at all.

It is appreciated that the palm food processor of the present invention has overturned the operational way done by the conventional food processor, with which the cut food or the ground powder is collected or received externally from the food processor while the treated food is processed for cutting slices, peeling skin, making shreds or grinding powder, to take the preceding food products in the receiving chamber arranged in the food processor instead and especially the skin residue treatment after skin peeling can provide a surprising effect. Furthermore, the knife seat can be quickly replaced with the casing depending on the necessity of the user such that the palm food processor of the present invention can perform the food processing with multiple functions.

While the invention has been described with reference to the a preferred embodiment thereof, it is to be understood that modifications or variations may be easily made without departing from the spirit of this invention, which is defined by the appended claims.

What is claimed is:

1. A palm food processor, comprising:
   a casing having an upper cover and a lower cover detachably joined to each other oppositely with a receiving chamber formed between the two covers, a top side of the upper cover having a hand grip part and a bottom of the lower cover having a cover opening; and
   a knife seat having a size and a shape thereof corresponding to the cover opening for engaging with the cover opening and a bottom thereof having a cutter;
   whereby, once a hand holds the hand grip part and the cutter contacts a treated food, the treated food is cut, sliced, peeled or ground into processed products through repeated motions of the food processor and the processed products are received in the chamber, wherein a pivot device is provided in an end of the casing and at an opposite contact face of the upper and the lower covers respectively and an engaging device is provided at another end of the casing such that the two covers are joined together and opened and closed pivotally.

2. The palm food processor as defined in claim 1, wherein the pivot device further comprises
   an attaching piece, extending downward from an end of the upper cover, having two opposite axial holes with a slit arranged at an inner side of each of the axial holes; and
   a fitting recess, being disposed at an end of the lower cover for receiving the attaching piece and extending a respective axial projection corresponding to the two axial holes so as to be inserted into the axial holes for engagement.

3. The palm food processor as defined in claim 1, wherein the engaging device has an protruding hook and a hook recess oppositely disposed at the upper and the lower covers respectively for engaging with each other.

4. The palm food processor as defined in claim 3, wherein the upper and the lower covers has an upper cover rim and a lower cover rim opposite to each other next to an edge of the engaging device for exerting a force conveniently and disengaging from each other.

5. The palm food processor as defined in claim 1, wherein the knife seat at both ends thereof has a projection and a press button and the cover opening at an end thereof has a recess and at another end thereof has an engaging groove with a projection hook provided at the two ends respectively so that the projection is inserted into the recess and the press button is engaged to the engaging groove to form engagement with the two projection hooks.

6. The palm food processor as defined in claim 1, wherein the knife seat at both lateral sides thereof has an engaging ear to engage with two lateral edges of the cover opening.

7. The palm food processor as defined in claim 1, wherein the hand grip part at an end thereof has a wide and thick end to extend to a narrow and thin end via a lateral arc recess.

8. The palm food processor as defined in claim 1, wherein the cutter is selected from a group consisting of a double edge peering knife, a shredding knife and a grinding knife.

* * * * *